May 17, 1927.  1,629,083
P. F. MEADE
HORSESHOE
Filed Sept. 17, 1924  2 Sheets-Sheet 1
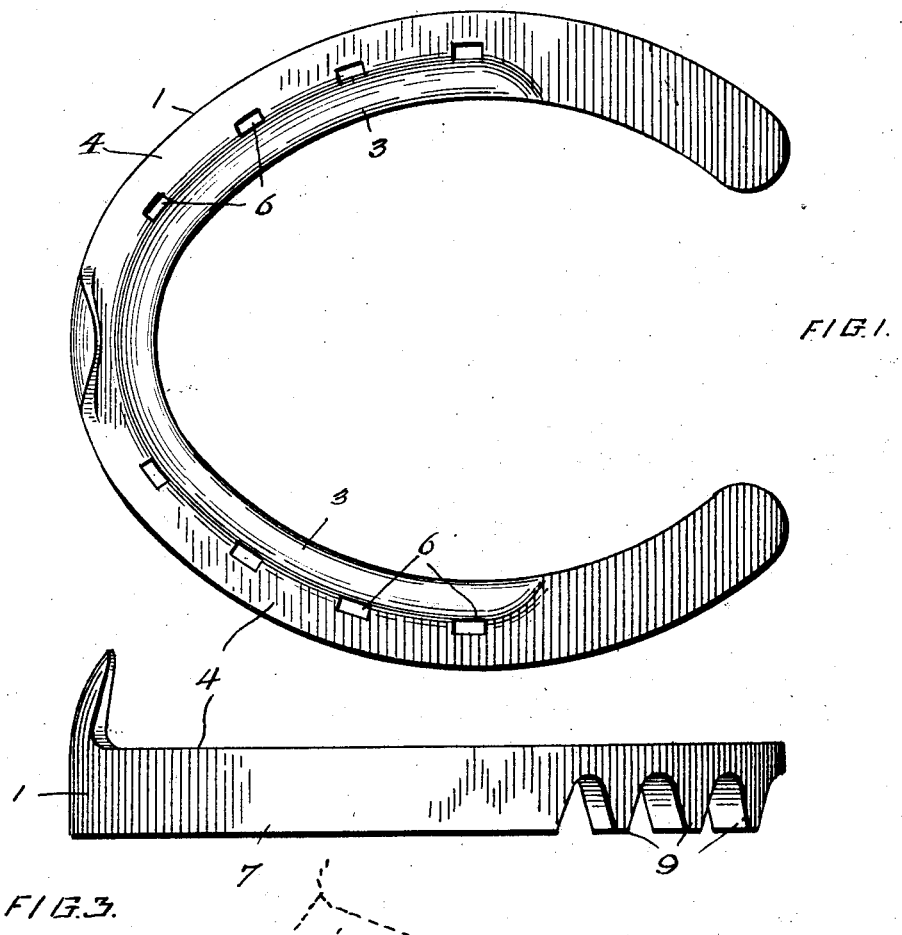
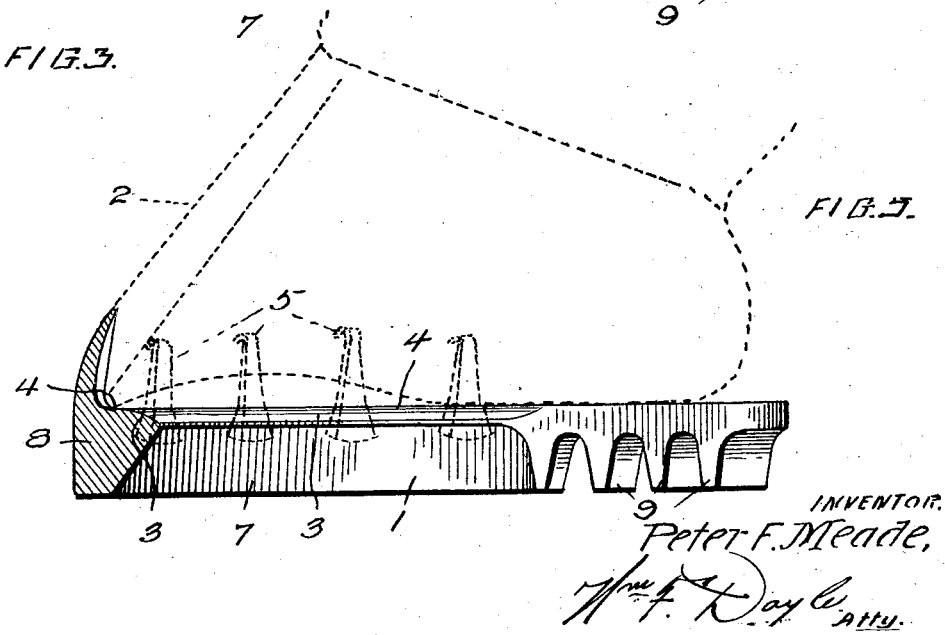
INVENTOR.
Peter F. Meade,
Wm. F. Doyle, Atty.

May 17, 1927.
P. F. MEADE
1,629,083
HORSESHOE
Filed Sept. 17, 1924   2 Sheets-Sheet 2
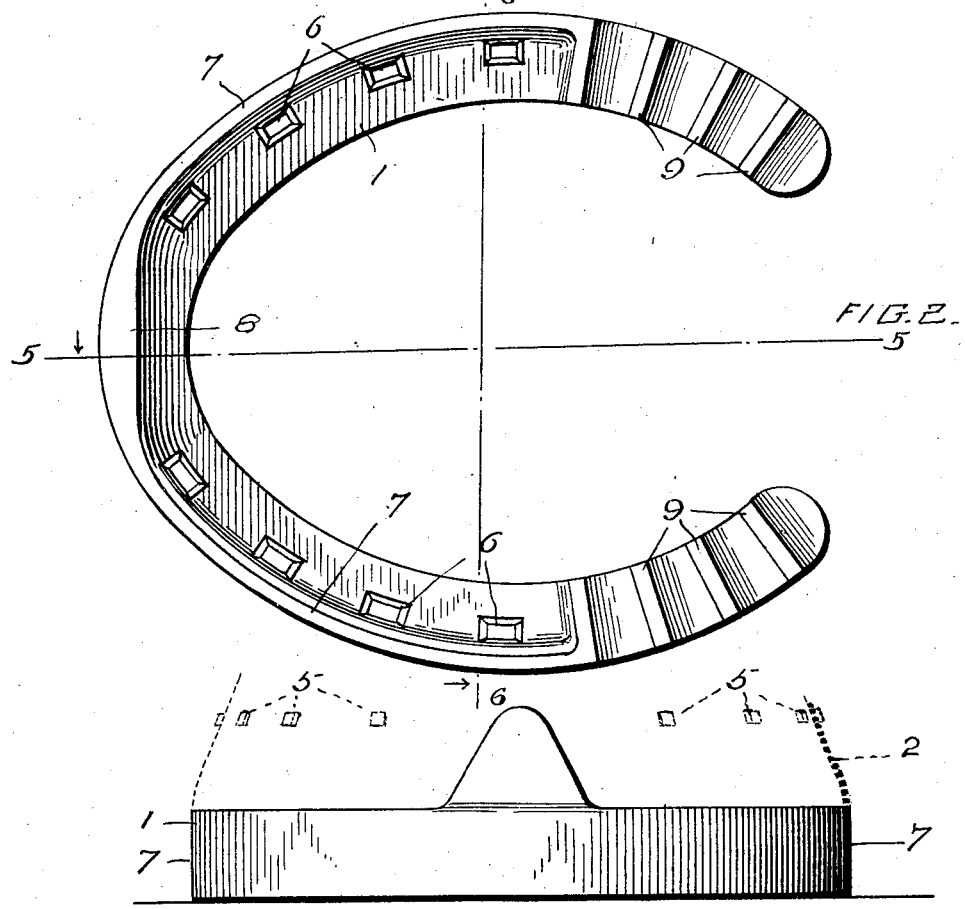
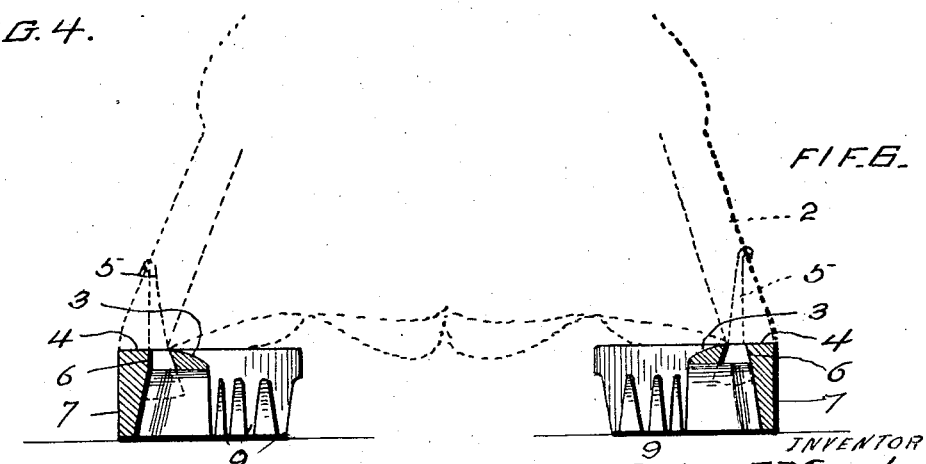
INVENTOR
Peter F. Meade, Patented May 17, 1927.

1,629,083

UNITED STATES PATENT OFFICE.

PETER F. MEADE, OF THE UNITED STATES ARMY, WASHINGTON, DISTRICT OF COLUMBIA.

HORSESHOE.

Application filed September 17, 1924. Serial No. 738,315.

The invention described herein may be used by the Government, or any of its officers or employees in prosecution of work for the Government, without payment to me of any royalty thereon.

This invention relates to a horseshoe and more particularly to a form of shoe especially adapted for use on various types of road surfaces as well as on surfaces covered by snow, either under freezing or melting conditions, on ice covered surfaces, or on soft surfaces such as turf.

An object of this invention is to provide a shoe of a simple, durable, and inexpensive construction that may be easily fitted, applied, and secured to the hoof of the animal.

A further object is to provide a shoe wherein the weight-supporting portion of the shoe is located directly beneath and otherwise corresponds to the weight-carrying portion of the hoof of the animal.

A further object is to provide a shoe having a depending tapering flange forming a continuous calk, which is the portion in direct contact with the ground, that will not only firmly grip the surface and prevent slipping in any direction due to the fact that the calk extends considerably over one-half around the shoe, but it will further provide an edge over which the shoe may roll in leaving the ground that corresponds accurately with the hoof of the animal at all points, and irrespective of the direction of roll, same will be natural, or over a portion of the shoe that is the same as the corresponding portion of the hoof.

A further object is to provide a shoe of such a construction as to permit of its being bent cold, in fitting same, and one in which the heel portion may be cut off without heating, should it be necessary to shorten the shoe, said shortening of the shoe being accomplished by a relatively simple operation due to the fact that said cut may be made at one of several portions of the heel between the heel calks at points where the thickness of the metal is greatly reduced.

These and other objects will appear in the following description and be finally pointed out in the claims forming a part of this application, it being understood that slight changes in form and minor details of construction may be resorted to without departing from the spirit of the invention.

Similar numerals indicate corresponding parts in all the figures of the drawings in which:

Fig. 1 is a plan view of my improved horseshoe,

Fig. 2 is an inverted plan of same,

Fig. 3 is a side edge view of the improved shoe,

Fig. 4 is a front edge view of same.

Fig. 5 is a section on line 5—5 of Fig. 2 showing the hoof in dots, and

Fig. 6 is a section on line 6—6 of Fig. 2 showing the hoof in dots.

Reference now being had to the drawings by numerals, 1 indicates the body portion of the shoe which is relatively thin and is the portion of the shoe on which the hoof 2 rests. The upper inner surface of the body 1 of the shoe, with the exception of the heel portion, is chamfered off or inclined as shown at 3, leaving the flat portion 4 on which the wall of the hoof rests. The securing nails 5 pass through openings 6 at approximately the center of the body portion of the shoe adjacent to the inner edge of its flat portion 4.

The hoof of a horse, especially that portion immediately within the wall, is extremely sensitive and the chamfering off of the shoe as shown at 3 avoids any contact between said tender portion of the hoof and the shoe and leaves the flat portion 4 on which the wall of the hoof rests, for the support of the weight of the animal, which is that portion of the hoof that is intended to support the weight and protect the inner tender tissues.

By locating the nail openings as shown, the nails may be directed up through the wall of the hoof, from a point adjacent to the inner line of the wall, upwardly and gradually outwardly through the wall until they emerge through its outer surface, approximately three-quarters of an inch above the shoe, where they are twisted off and turned down in a clinch.

As stated above, the normal weight supporting portion of the hoof is the wall or outer one-quarter to three-eighths of an inch of thickness, and to provide a shoe that will correspond with the condition found in the hoof structure, this invention provides a depending flange or main calk 7 forming a continuation of the wall downwardly at its outer edge. Said calk 7 which carries the weight of the animal is the outer peripheral portion of the shoe over which the wall of the hoof rests. Said calk 7 is tapered on its inner surface toward its lower edge, and is adapted to cut through soft surfaces such as turf and the like, and prevent slipping.

Under ordinary conditions a horseshoe will wear in two at the toe, and to delay the wear at that point, the main calk 7 is reinforced by a thickening of the metal as shown at 8. Said thickening portion 8 corresponds to and functions in a manner similar to the toe calk of the usual construction, except that the form of calk here shown increases in thickness toward its base, or point of juncture with the body portion 1 of the shoe. Said increasing thickness of the said calk is accomplished entirely on its inner surface, and without altering the regularity or contour of the outer edge of that portion of the shoe, which as stated above, corresponds accurately with and is directly beneath, corresponding portions of the hoof.

By reference to the drawings it will be seen that the edge or outer surface of the shoe throughout, is perpendicular to the surface on which the shoe rests, is directly beneath and corresponds with all portions of the hoof irrespective of the portion of the shoe over which the hoof rolls in leaving the ground, always presents an edge that corresponds to that of the hoof of the animal, and therefore presents no abnormal conditions irrespective of the direction of the roll. This is not true with respect to other forms of shoes, especially so when the roll of the hoof is over any other portion than the toe of the shoe.

As stated above, the continuous main body calk 7 will grip the surface and tend to prevent slipping in all directions, but to further increase the grip in a forward and rearward direction, a plurality of transverse heel calks 9 are provided. Calks 9 are arranged across the heel portions of the shoe, the forward heel calks 9 forming a continuation of calk 7, and the outer ends of the heel calks are flush with and form a continuation of the outer edge of the shoe and offer the same natural support to the hoof that is provided by calk 7.

In view of the construction shown, it will be seen that the supporting surface of the shoe whether flat on the ground, or approaching or leaving said position at any angle, corresponds with that which the hoof would present without the shoe, and thereby presents a highly efficient shoe wherein the normal tread is provided under all conditions.

Having described my invention, what I desire to claim by Letters Patent is:

1. A horseshoe including a main body having a toe portion and heel portions, a plurality of transverse calks at the heel portions spaced apart each of which is provided with a relatively wide base and a narrow face to prevent the anchoring of accumulations therebetween, a main body calk formed on a regular curve conforming substantially to the contour of the body, said main body calk being disposed on the body in a manner to present a supporting surface relatively narrow with respect to the body of the shoe and lying directly beneath the outer edge of said body, the heel end of said main body calks merging into the foremost of said transverse heel calks, a toe calk so disposed on the body as to present a supporting surface relatively wide with respect to the body calks, said body calks merging into the toe calk at their forward ends directly beneath the outer edge of the body of the shoe, said toe calk increasing in thickness at its base to approximately the width of the body portion of the shoe to prevent the anchoring of accumulation of foreign matter.

2. A horseshoe including a body having a toe portion and heel portions, a plurality of transverse calks at the heel portions, a toe calk, and main body calks extending between and merging into a forward heel calk and said toe calk, the outer face of said calks all extending vertically from the outer edge of the body throughout, said calks being provided with relatively wide bases and narrow contact faces to prevent the anchoring of accumulations of foreign matter and prevent slipping in all directions.

3. A horseshoe including a body having a toe portion and heel portions, a plurality of transverse calks at the heel portions, a toe calk, and main body calks extending between and merging into a forward heel calk and said toe calk, the outer faces of said calks all extending vertically from the outer edge of the body throughout and being tapered on their inner faces from wide bases to relatively narrow contact faces to prevent anchoring of accumulations.

PETER F. MEADE.